United States Patent
Park et al.

(10) Patent No.: US 6,895,544 B1
(45) Date of Patent: May 17, 2005

(54) ENCODING METHOD OF MULTIMEDIA DATA AND ENCODING DEVICE THEREFOR

(75) Inventors: Dong-Seek Park, Daegu (KR); Jeong-Hoon Park, Seoul (KR); Yung-Lyul Lee, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 579 days.

(21) Appl. No.: 09/744,673

(22) PCT Filed: Jun. 12, 2000

(86) PCT No.: PCT/KR00/00615

§ 371 (c)(1),
(2), (4) Date: Mar. 23, 2001

(87) PCT Pub. No.: WO00/78054

PCT Pub. Date: Dec. 21, 2000

(30) Foreign Application Priority Data

Jun. 12, 1999 (KR) .................................. 1999-21909
Dec. 23, 1999 (KR) .................................. 1999-61326

(51) Int. Cl.[7] ............................................. H03M 13/15
(52) U.S. Cl. ...................... 714/776; 370/469; 714/779
(58) Field of Search ................... 714/774, 776, 714/779; 370/469, 473

(56) References Cited

U.S. PATENT DOCUMENTS

| | | | | |
|---|---|---|---|---|
| 5,497,404 A | | 3/1996 | Grover et al. ............... | 375/357 |
| 5,633,872 A | * | 5/1997 | Dinkins ....................... | 370/312 |
| 5,696,903 A | * | 12/1997 | Mahany ....................... | 709/228 |
| 5,715,250 A | * | 2/1998 | Watanabe ............... | 370/395.53 |
| 5,717,689 A | * | 2/1998 | Ayanoglu .................... | 370/349 |
| 5,844,885 A | * | 12/1998 | Grob et al. ................... | 370/216 |
| 5,886,989 A | * | 3/1999 | Evans et al. ................. | 370/347 |
| 5,889,791 A | * | 3/1999 | Yang .......................... | 714/752 |
| 5,936,965 A | * | 8/1999 | Doshi et al. ................. | 370/469 |
| 5,987,034 A | * | 11/1999 | Simon et al. ................ | 370/465 |
| 6,041,054 A | * | 3/2000 | Westberg .................... | 370/389 |
| 6,061,820 A | * | 5/2000 | Nakakita et al. ............ | 714/751 |
| 6,064,649 A | * | 5/2000 | Johnston ................... | 370/310.2 |
| 6,122,293 A | * | 9/2000 | Frodigh et al. ............. | 370/473 |
| 6,226,301 B1 | * | 5/2001 | Cheng et al. ............... | 370/474 |
| 6,349,138 B1 | * | 2/2002 | Doshi et al. ................ | 380/200 |
| 6,351,456 B1 | * | 2/2002 | Struhsaker et al. ......... | 370/280 |
| 6,480,477 B1 | * | 11/2002 | Treadaway et al. ......... | 370/314 |
| 6,512,751 B1 | * | 1/2003 | Struhsaker et al. ......... | 370/329 |
| 6,542,490 B1 | * | 4/2003 | Ahmadvand et al. ....... | 370/338 |

FOREIGN PATENT DOCUMENTS

| | | |
|---|---|---|
| CA | 2237293 | 7/1997 |
| JP | 5-035624 B | 2/1993 |
| JP | 05-035624 | 2/1993 |
| JP | 5-035624 | 2/1993 |
| JP | 7-336367 | 12/1995 |
| JP | 10-285147 | 10/1998 |
| JP | 11-154935 | 6/1999 |
| WO | WO 97/24832 | 7/1997 |
| WO | WO 99/07100 | 2/1999 |

OTHER PUBLICATIONS

Japanese Office Action dated Jul. 22, 2003 for Japanese Patent Application No. 2001–504180.

* cited by examiner

*Primary Examiner*—Stephen M. Baker
(74) *Attorney, Agent, or Firm*—Sughrue Mion, PLLC

(57) ABSTRACT

An encoding method for wireless transceiving of multimedia data including video data, and an encoding device therefor are provided. The encoding method includes (a) generating a length field representing the number of bits of a payload, (b) generating an error correction code by performing error correction coding with respect to the length field, and (c) inserting the length field and the error correction code during radio link protocol (RLP) framing. The encoding method reduces overhead when multimedia data including video data is transmitted and received under the radio environment, and increases error robustness, thereby improving the quality of an image.

33 Claims, 12 Drawing Sheets

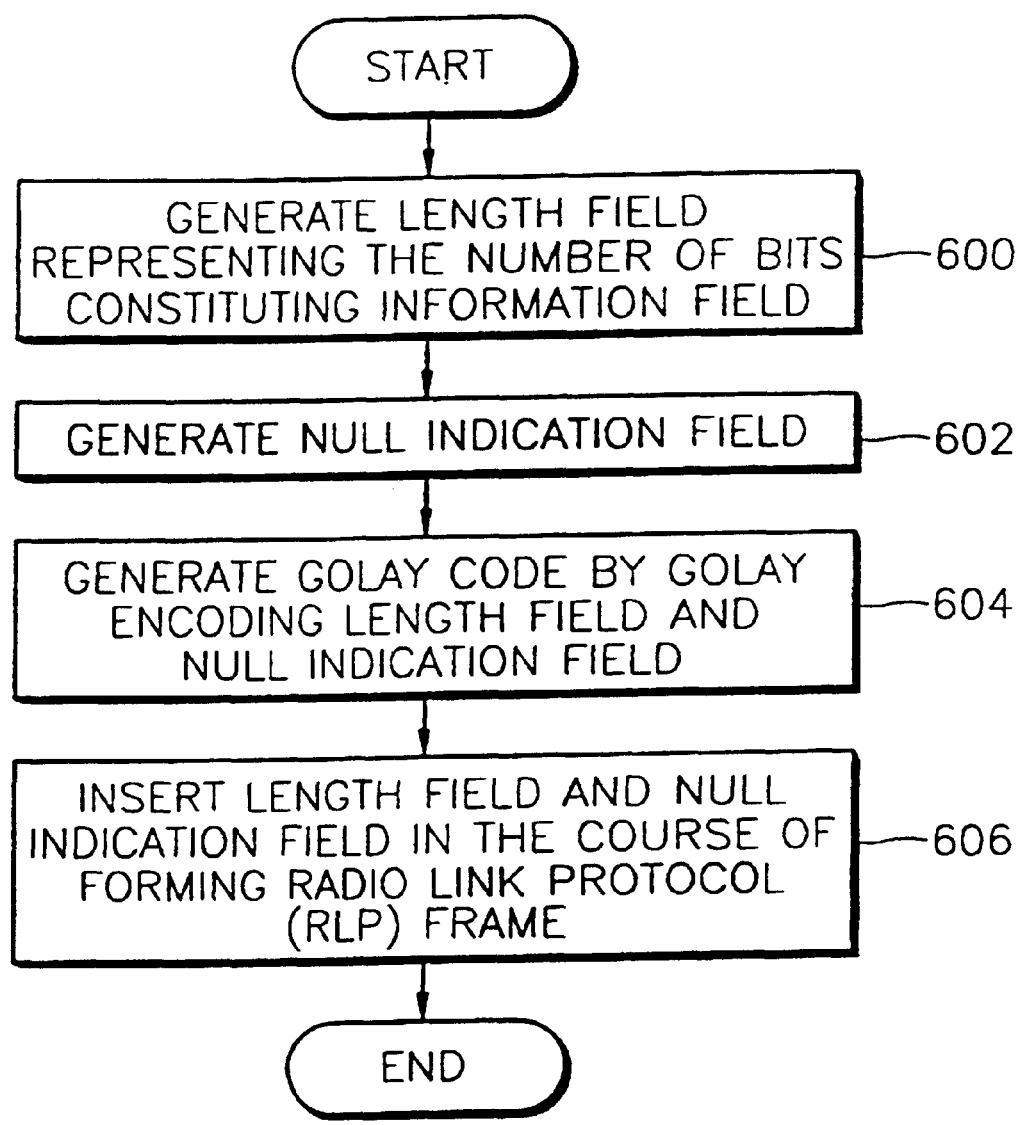

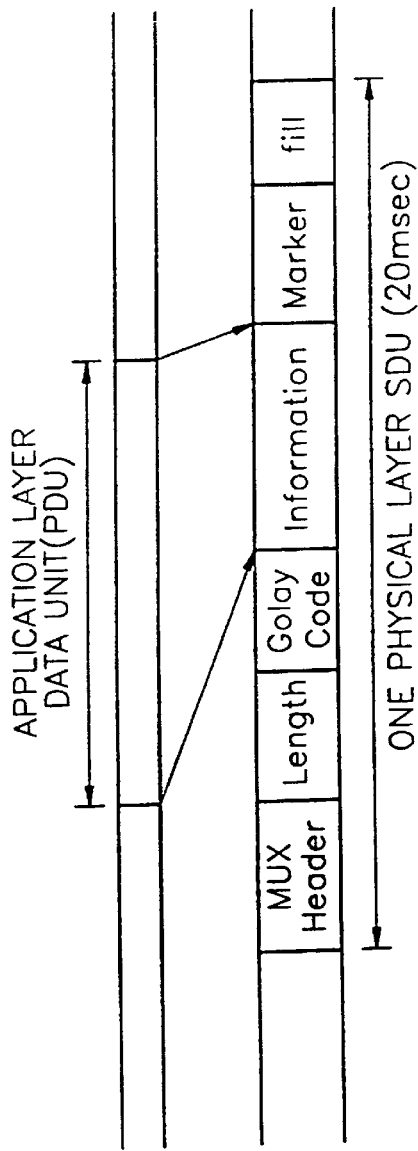

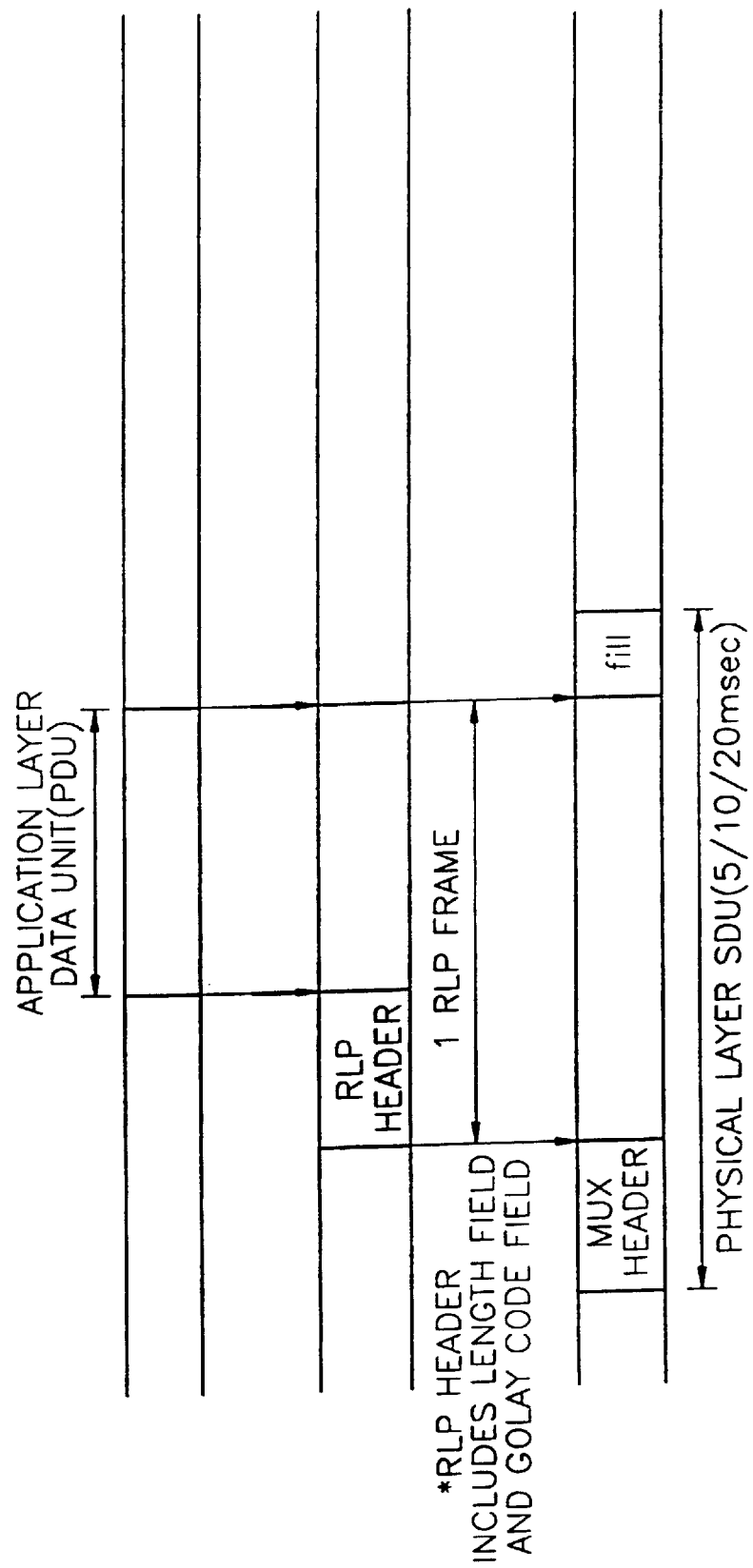

ENCODING METHOD OF MULTIMEDIA DATA AND ENCODING DEVICE THEREFOR

BACKGROUND OF THE INVENTION

1. Field of the Invention

The present invention relates to coding and decoding methods and packetizing and depacketizing methods, and more particularly, to a method of encoding and decoding and packetizing and depacketizing multimedia data including video data in a wireless transmitting system or in a wireless receiving system.

2. Description of the Related Art

A wireless transmitting device and a wireless receiving device of a wireless code division multiple access (CDMA) system includes a plurality of layers as shown in FIG. 1. A user layer is an application layer. The standards associated with the user layer are codec-related standards such as IS-95, H.324M, H.323 and T. 120. A physical layer, which performs channel coding, PN spreading and modulation, includes a layer where air interfacing is performed. A media access control (MAC) layer or a MUX_sublayer has a signaling portion and includes a radio link protocol (RLP) layer or a radio link control (RLC) protocol layer, where a payload received from a radio path is converted into an input format used in the physical layer. Among the three layers, the physical layer is realized in hardware, so becomes less flexible since it has been determined by the standard. However, the user layer can provide flexibility in terms of its network-independent characteristics.

FIG. 2 is a block diagram for explaining framing performed in an RLP layer. If there are N applications such as a first application, a second application, . . . and an N-th application, N RLPs, that is, a first RLP layer, a second RLP layer, . . . , and an N-th RLP layer are provided. The RLP layers are connected to a physical layer via a MUX and QoS (Quality of Service) sublayer. FIG. 3 illustrates the formation of a service data unit (SDU) for the physical layer, and is performed in the RLP layer. In this process, a packet data unit (PDU) of an application layer (for example, an H.223 MUX_PDU in the case of an H.323M standard, and a packet data unit for H.225 in the case of an H.233 standard) is rarely completely aligned within a 5, 10 or 20 msec window without insertion of overhead. Accordingly, there are three cases shown in FIGS. 4A through 4C.

FIG. 4A refers to a case where an application layer data unit (PDU) is aligned within a physical layer SDU. Referring to FIG. 4A, in this case, overhead may be increased due to the excessive number of fill bits. FIG. 4B refers to a case where two or more application layer data units (PDUs) are aligned within a physical layer SDU. In this case, if synchronization points or the information on the length of a data unit (PDU) of an application layer is damaged, detection of the synchronization point for the second or consecutive application layer data units (PDUs) in the physical layer SDU is not guaranteed. FIG. 4C refers to a case where a data unit (PDU) of an application layer is aligned within two or more physical layer SDUs. In this case, it is not known in which portion the data unit (PDU) of an application layer is segmented.

FIG. 5 shows the structure of an RLP frame to explain problems caused upon RLP framing. In the RLP frame structure shown in FIG. 5, the overall length of a payload including an information field is variable. For example, if the information field is not completely filled with information bits, the empty portion of the information field and the remaining empty portion of the RLP frame are filled with fill bits. Thus, the total length of an RLP frame is fixed. However, if the length field is damaged, the exact length of the information field cannot be ascertained, thus generating serious errors.

SUMMARY OF THE INVENTION

An object of the present invention is to provide an encoding method by which overhead is reduced and error robustness is increased, so that the transceiving of multimedia data including video data can be performed more reliably and efficiently in a radio environment.

Another object of the present invention is to provide an encoding device which performs the encoding method.

Still another object of the present invention is to provide a method of decoding frame data which has been encoded by the encoding method.

Yet another object of the present invention is to provide a decoding device which performs the decoding method.

To achieve the first object of the present invention, an encoding method for transceiving multimedia data including video data in a wireless environment, according to an aspect of the present invention, includes the steps of: (a) generating a length field representing a number of bits in an information field; (b) generating an error correction code by performing error correction coding with respect to the length field; and (c) inserting into a frame the length field and the error correction code during radio link protocol (RLP) framing.

The encoding method further includes a step (a-1) of generating a null indication field indicating an existence of only null data, if only null data exists without information data. Preferably, the step (b) includes a step of generating an error correction code by performing error correction coding with respect to the length field and the null indication field.

Preferably, the step (c) further includes steps of performing RLP framing for a fixed-length RLP frame and inserting into the frame a series of fill bits having a constant binary value during the RLP framing to achieve byte alignment to complete the fixed length. Alternatively, in the step (c), RLP framing for a variable-length RLP frame is performed, and the insertion into the frame of fill bits may not be performed. It is also preferable that the error correction coding in the step (b) is Golay coding, and the error correction code is a Golay code which is generated by the Golay coding.

To achieve the first object of the present invention, an encoding method for transceiving multimedia data including video data under a wireless environment, according to another aspect of the present invention, includes the steps of: (a) generating an information field that is video data comprised of a data unit of an application layer; (b) generating a length field representing the number of bits in the information field; (c) generating an error correction code by performing error correction coding with respect to the length field; and (d) inserting into a frame the fields and the error correction code in the course of forming a physical layer service data unit (SDU).

To achieve the first object of the present invention, an encoding method for transceiving multimedia data including video data under a wireless environment, according to still another aspect of the present invention, includes the steps of: (a) generating a plurality of information fields which are a plurality of application layer data units that can fit into a predetermined window; (b) generating a length field representing the sum of the number of bits in each of the plurality of information fields; (c) generating an error correction code by performing error correction coding with respect to the length field; and (d) inserting into a frame the fields and the error correction code in the course of forming a physical layer service data unit (SDU).

To achieve the first object of the present invention, an encoding method for transceiving multimedia data including video data under a wireless environment, according to yet another aspect of the present invention, includes: (a) estimating the state value of a channel; if it is determined in step (a) that the state value of the channel is equal to or less than a predetermined reference value; (a-1) generating an information field which is video data comprised of an application layer data unit (PDU); (b-1) generating a length field representing the number of bits in the information field; (c-1) generating an error correction code by performing error correction coding with respect to the length field; and (d-1) inserting into a frame the fields and the error correction code in the course of forming a physical layer service data unit (SDU); if it is determined in step (a) that the state value of the channel is greater than the predetermined reference value, (a-2) generating a plurality of information fields which are a plurality of application layer data units (PDUs) which fit into a predetermined window; (b-2) generating a length field representing the sum of the number of bits in each of the plurality of information fields; (c-2) generating an error correction code by performing error correction coding with respect to the length field; and (d-2) inserting into the frame the fields and the error correction code in the course of forming a physical layer service data unit (SDU).

To achieve the second object of the present invention, an encoding device for wireless transceiving of multimedia data including video data, according to an aspect of the present invention, includes: a length field generator for generating a length field representing the number of bits in an RLP payload; a null indication field generator for generating a null indication field; an error correction coding unit for generating an error correction code by performing error correction coding with respect to the length field and the null indication field; and a radio link protocol (RLP) framing unit for performing RLP framing and inserting into a frame the length field, the null indication field, and the error correction code in the course of RLP framing.

To achieve the second object of the present invention, an encoding device for wireless transceiving of multimedia data including video data, according to another aspect of the present invention, includes: an information field generator for generating an information field having an amount of video data that fits into a window having a predetermined length; a length field generator for generating a length field representing the number of bits of an RLP payload; an error correction coding unit for generating an error correction code by performing error correction coding with respect to the length field; and a framing unit for inserting into a frame the fields and the error correction code in the course of forming a physical layer service data unit (SDU).

To achieve the second object of the present invention, an encoding device for wireless transceiving of multimedia data including video data, according to still another aspect of the present invention, includes: a channel state estimator for estimating the state value of a channel, and outputting a control signal having a first logic if the state value of the channel is equal to or less than a predetermined reference value, and outputting a control signal having a second logic if the state value of the channel is greater than the predetermined reference value; an information field generator for generating an information field that is video data comprised of an application layer data unit (PDU) in response to the control signal having the first logic, and generating a plurality of information fields, which are a plurality of application layer data units (PDUs) that can fit into a predetermined window in response to the control signal having the second logic; a length field generator for generating a length field representing the number of bits of an RLP payload; an error correction coding unit for generating an error correction code by performing error correction coding with respect to the length field; and a framing unit for inserting into a fixed-length RLP frame the fields and the error correction code in the course of forming a physical layer service data unit (SDU).

To achieve the third object of the present invention, there is provided a method of receiving and decoding frame data encoded by an encoding method including generating a first length field representing the number of bits of an information field, generating an error correction code by performing error correction coding with respect to the first length field, and inserting into a frame the first length field and the error correction code in the course of framing. This method includes the steps of: (a) restoring from the frame data the first length field representing the length of the information field; (b) restoring a second length field representing the number of bits of the information region by decoding the error correction code; (c) setting the second length field as a set length field if there is an error in the first length field, and otherwise, setting the first length field as the set length field; and (d) performing decoding with reference to the set length field.

The decoding method further includes the steps of: (e) restoring a null indication field representing that the information field includes null bits; and (f) determining whether the null indication field represents that the frame is filled with only null bits. It is preferable that if it is determined in step (f) that the null indication field represents that the frame is filled with only null bits, even if "1" is generated in a fill bit region, "1" is not regarded as an information bit.

To achieve the fourth object of the present invention, there is provided a device for receiving and decoding frame data encoded by an encoding device including a length field generator for generating a first length field representing the number of bits in an information field, an error correction coding unit for generating an error correction code by performing error correction coding with respect to the first length field, and a framing unit for performing framing and inserting into a frame the first length field and the error correction code in the course of framing. The decoding device includes: an unframing unit for restoring the first length field representing the length of the information field from received service data unit (SDU) frame data, and outputting an error signal having a first logic level indicating the existence of an error upon restoring the first length field, if an error is generated; an error correction code decoder for restoring a second length field representing the number of bits in the information field by decoding the error correction code; a length field setting unit for setting the second length field as a set length field in response to the error signal having the first logic level and outputting the second length field to the unframing unit, and setting the first length field as the set length field in response to an error signal having a second logic level and outputting the first length field to the unframing unit; and a decoding unit for decoding the restored information field to output video data.

BRIEF DESCRIPTION OF THE DRAWINGS

The above objectives and advantages of the present invention will become more apparent by describing in detail preferred embodiments thereof with reference to the attached drawings in which:

FIG. 6 is a flowchart illustrating the essential steps in an encoding method according to a first embodiment of the present invention;

FIG. 7A shows the structure of a frame formed by the encoding method according to the first embodiment of the present invention described with reference to FIG. 6;

FIG. 7B shows the structure of a frame formed by an encoding method according to a second embodiment of the present invention;

FIG. 7C illustrates the formation of a physical layer SDU (service data unit) using an encoding method according to a third embodiment of the present invention;

FIG. 7E illustrates the formation of a physical layer SDU using an encoding method according to a fifth embodiment of the present invention;

DESCRIPTION OF THE PREFERRED EMBODIMENTS

Figure 1:
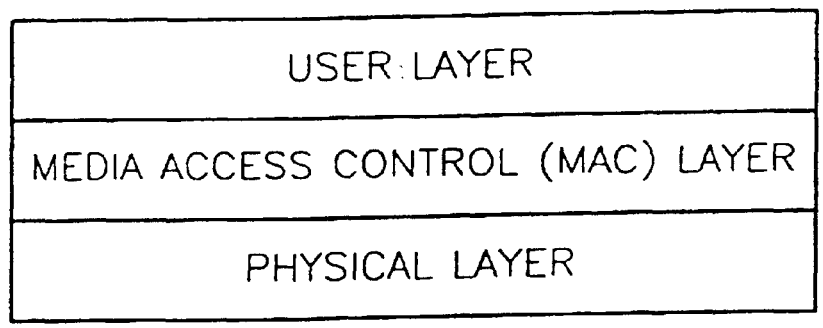
FIG. 1 is a layer structure of a general wireless transceiving device.
Figure 2:
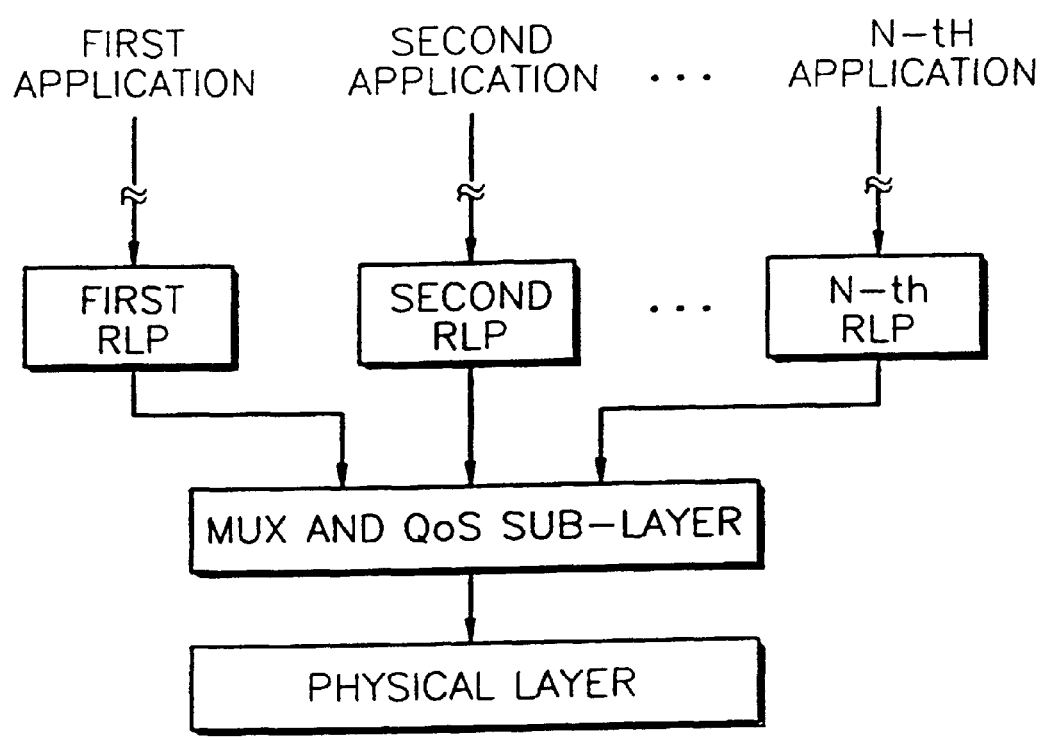
FIG. 2 is a block diagram illustrating framing performed in a radio link protocol (RLP) layer in the layer structure of FIG. 1.
Figure 3:
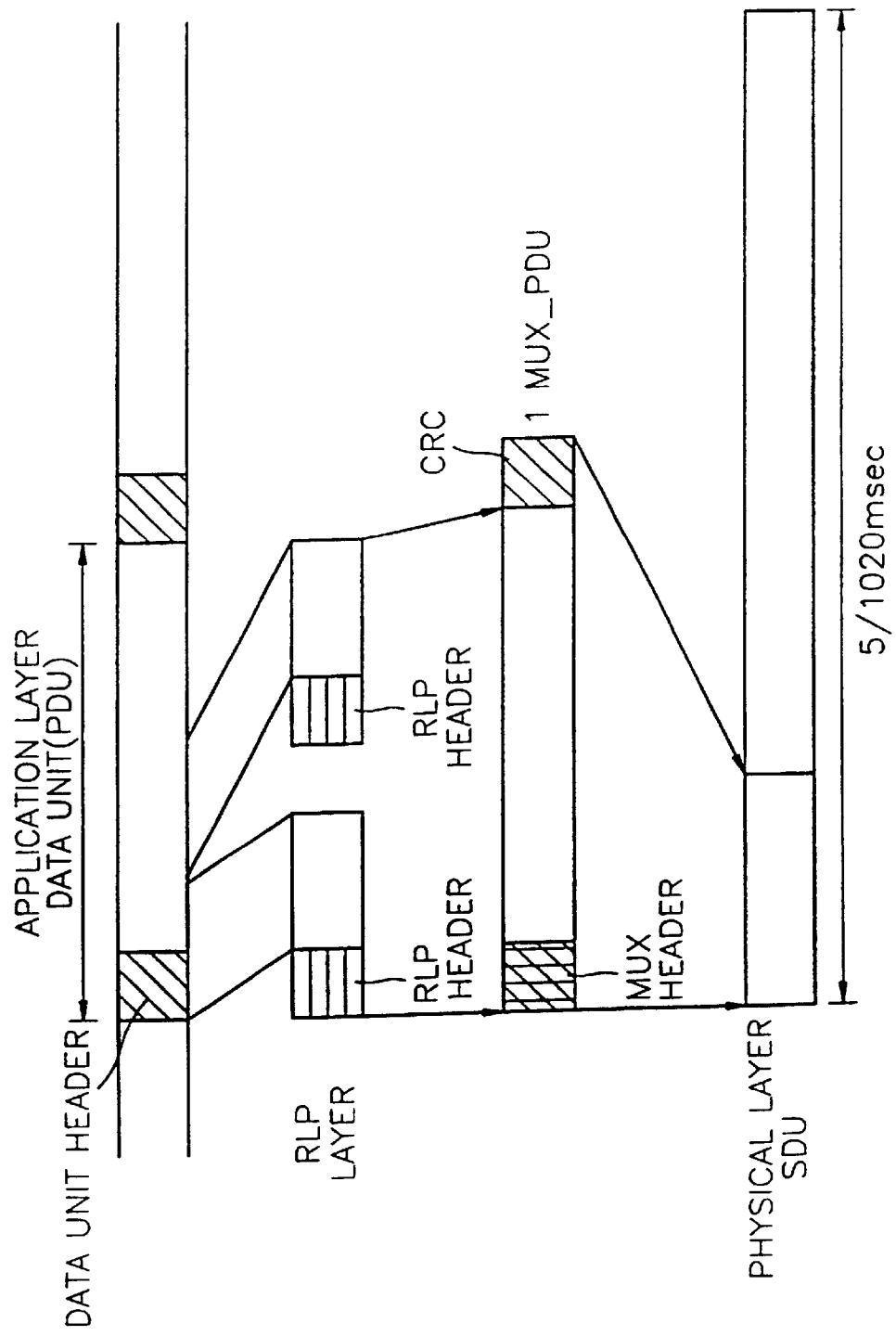
FIG. 3 illustrates the formation of a service data unit (SDU) for a physical layer with data of an application layer in the layer structure of FIG. 1.
Figure 4A:
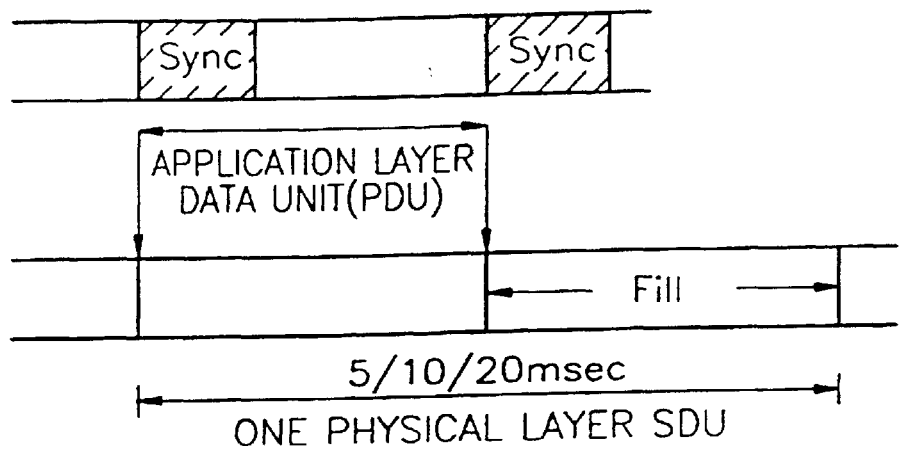
FIG. 4A illustrates a case where an application layer data unit is aligned within a physical layer SDU.
Figure 4B:
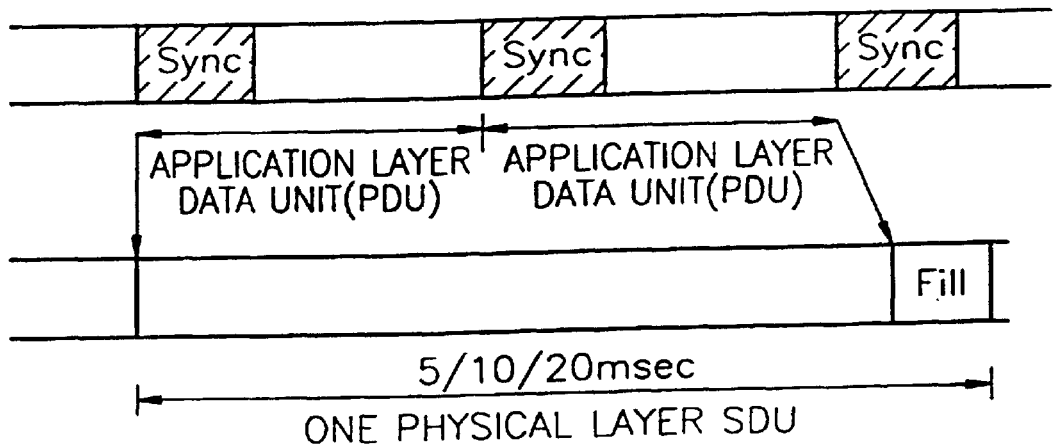
FIG. 4B illustrates a case where two or more application layer data units are aligned within a physical layer SDU.
Figure 4C:
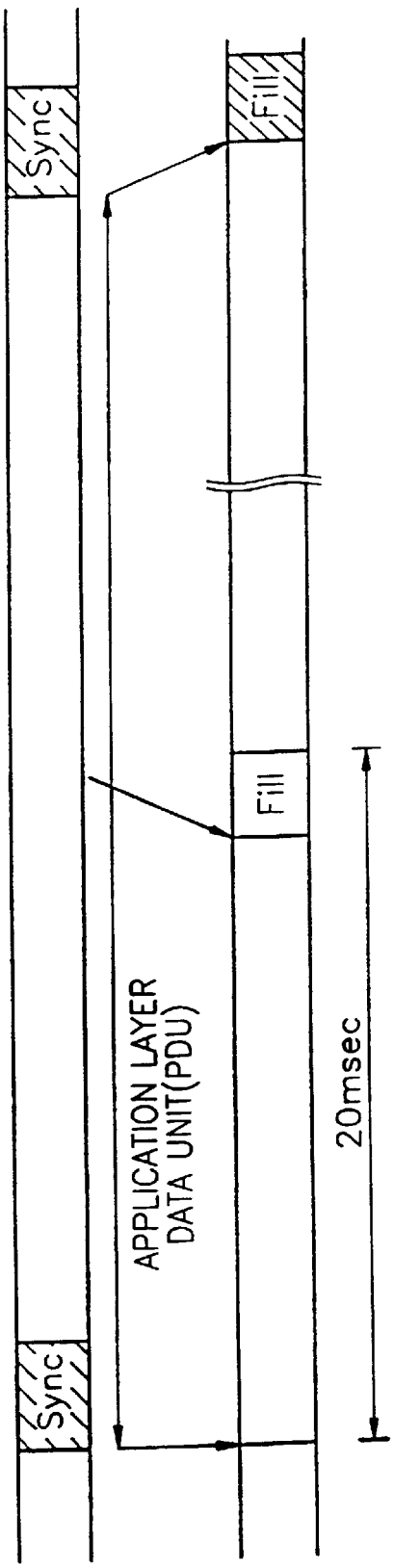
FIG. 4C illustrates a case where an application layer data unit is aligned within two or more physical layer SDUs.
Figure 5:
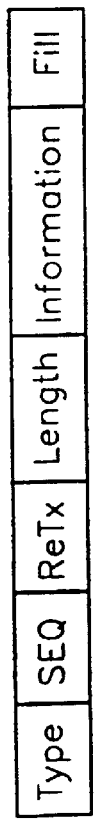
FIG. 5 shows the structure of an RLP frame.

An encoding method according to a first embodiment of the present invention shown in FIG. 6 is applied to radio link protocol (RLP) framing to form an RLP frame having a fixed length. A length field representing the number of bits constituting an information field is generated (step 600). Here, the number of bits of an information field is variable, and can be understood to denote the length of a payload. Then, when no information bits exist except null data, a null indication field which indicates that no information bits exist except null data is generated (step 602). Next, a Golay code, which is an error correction code, is formed by performing Golay coding, which is an error correction coding method, with respect to the length field and the null indication field (step 604). Following this, the length field, the null indication field, and the Golay code are inserted in the course of forming an RLP frame (step 606). Thereafter, in this embodiment, an empty portion of the RLP frame is filled with fill bits for achieving byte alignment.

FIG. 7A is a block diagram of the structure of a frame formed by the encoding method according to the first embodiment described with reference to FIG. 6. Here, the frame includes a length field representing the number of information bits of an information field, and a null indication field representing that the frame has no information bits and that the frame is filled with "0"s. The frame also includes a Golay code produced by Golay coding the length field and the null indication field in step 604. Also, the bits are inserted into the frame.

Upon decoding the frame encoded by the encoding method described above, the length field representing the number of information bits, and the null indication field representing that an empty portion of the frame is filled with "0"s, are decoded. Thus, when the null indication field represents that the frame is filled with only "0"s, even if a "1" is generated in the fill bit region due to an error, "1" is not regarded as an information bit.

The length field and the null indication field are protected from errors by the Golay code. Hence, when Golay decoding of the Golay code is performed upon decoding, the length field and the null indication field can be restored by error correction even if the inserted length field and null indication field are damaged.

An encoding method according to a second embodiment of the present invention can be applied to RLP framing to form an RLP frame having a variable length. In the second embodiment, the steps 600, 602, 604 and 606 in the first embodiment of FIG. 6 are performed, but fill bits are not inserted since a variable bit rate is allowed. FIG. 7B shows the structure of a frame formed by the encoding method according to the second embodiment. It becomes evident from FIG. 7B that the frame formed by the encoding method according to the second embodiment includes no fill bit regions, which correspond to overhead. Therefore, the bit rate efficiency can be improved.

In the above two embodiments, encoding using RLP framing is performed. However, transparent transmission of video information due to a reduction in redundancy or overhead information is required in some cases. It is preferable that these cases use encoding methods according to embodiments described below.

An encoding method according to a third embodiment of the present invention can be applied to the case where an application layer data unit (for example, an H.223 MUX_PDU in the case of an H.324M standard, and a packet data unit for H.225 in the case of an H.323 standard) is aligned with a physical layer SDU without performing RLP framing. In this embodiment, first, an information field for video data comprised of an application layer data unit, for example, an H.223 MUX_PDU, is generated. Then, a length field representing the length of the application layer data unit is generated. Following this, a Golay code is generated by Golay coding the length field.

The generated fields and code are inserted within a physical layer SDU. In the third embodiment, the length field is inserted after a MUX header, and a marker having uniqueness and a predetermined length is inserted between the information field and a fill bit region. Referring to FIG. 7C, which illustrates a process for forming a physical layer SDU using the encoding method according to the third embodiment, it can be seen that an application layer data unit, for example, an H.223 MUX_PDU, is aligned within a physical layer SDU. According to the third embodiment, the physical layer SDU has no overhead, which is generated upon RLP framing. The length of data generated in a user layer is almost the same as the length of a physical layer SDU. Also, a predetermined window, for example, a 5, 10 or 20 msec window, is filled by inserting fill bits, and a marker is placed in front of the fill bit region filled with null data "0".

Upon decoding the encoded frame according to the third embodiment, the length field is protected from errors by a Golay code, thus increasing the reliability with respect to the length of the information field. Also, the third embodiment does not use RLP framing while protecting the length of the application layer data unit (PDU), so that overhead can be reduced while error resilience increases. Furthermore, the marker inserted between the information field and the fill bit region can be detected upon decoding since it is unique, so that the error rate is reduced.

Figure 7D:
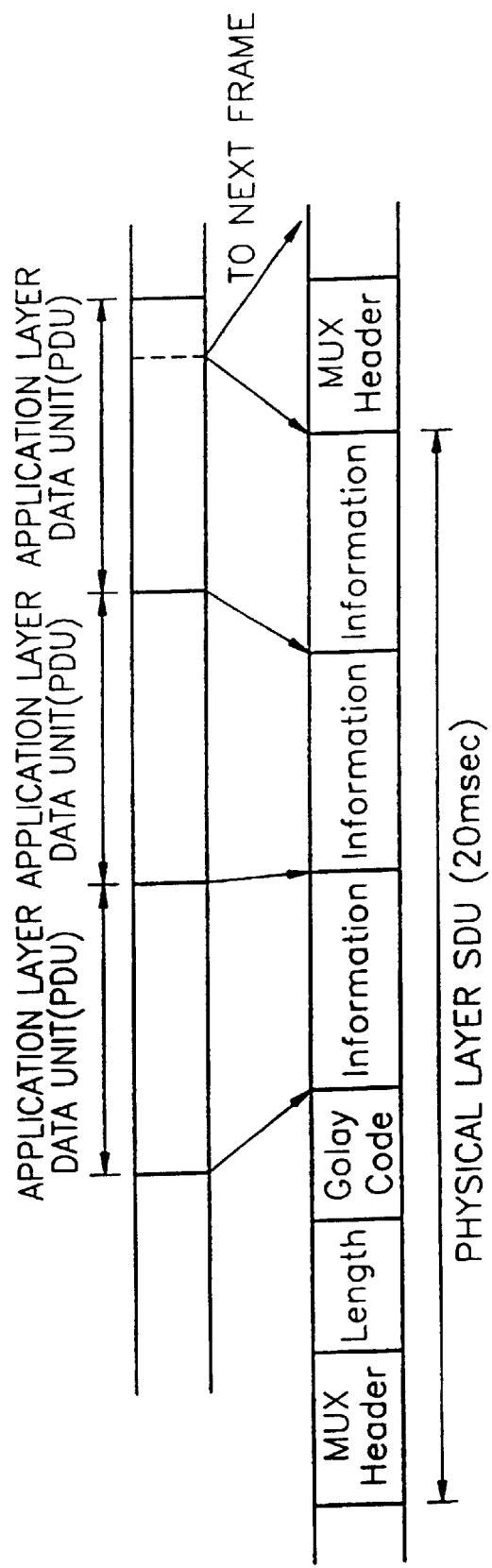
FIG. 7D illustrates the formation of a physical layer SDU using an encoding method according to a fourth embodiment of the present invention.

An encoding method according to a fourth embodiment of the present invention can be applied to the case where at least two application layer data units (PDUs) are aligned within a physical layer SDU without performing RLP framing. Referring to FIG. 7D, which illustrates the formation of a physical layer SDU using the encoding method according to the fourth embodiment, a plurality of information fields, which are a plurality of application layer data units (PDUs) that can be inserted within a 20 msec window, are generated. Next, a length field representing the sum of the number of bits constituting each of the plurality of information fields is generated. Here, the number of bits of an information field is variable, and can be understood to denote the length of a payload. Following this, a Golay code is generated by Golay coding the length field.

The generated length field and Golay code are inserted within a physical layer SDU in the course of forming a physical layer SDU. In this embodiment, the length field is inserted after a MUX header, and an application layer data unit (PDU) is inserted instead of the fill bit region and the marker field described with reference to FIG. 7C.

Referring to FIG. 7D, it becomes evident that two complete application layer data units (PDUs) and part of an application layer data unit (PDU) are aligned within a physical layer SDU. According to the fourth embodiment, it is possible to reduce overhead, which is caused upon RLP framing, and data generated in a user layer is continuously inserted to complete the length of the physical layer SDU.

The encoded frames according to the third and fourth embodiments have a reduced amount of overhead since RLP framing is not used. Also, the encoding methods according to the third and fourth embodiments can be selectively used when the state of a channel is good and video data is required to be transmitted at a fast transmission rate.

Although embodiments which do not use RLP framing are described above, the following embodiments use RLP framing.

FIG. 7E illustrates the formation of a physical layer SDU using an encoding method according to a fifth embodiment of the present invention. The encoding method according to the fifth embodiment can be applied to the case where an application layer data unit (PDU) is aligned within a physical layer SDU with RLP framing. Here, an application layer data unit (PDU) does not necessarily include all the data between the synchronization point of an application layer data unit (PDU) and the synchronization point of the next application layer data unit (PDU). In the fifth embodiment, video data corresponding to an application layer data unit (PDU) is converted into an RLP frame by RLP framing. During RLP framing, a length field representing the length of an application layer data unit (PDU) is generated, and a Golay code is generated by Golay coding the length field. The RLP frame has an RLP header field in which the length field and the Golay code field are included. A MUX header, the RLP frame, and a fill bit region constitute a physical layer SDU.

Upon decoding the encoded frame according to the fifth embodiment, the reliability of the length of an information field is increased since the length field is protected from errors by the Golay code. Also, the length information of the application layer data unit (PDU) is protected, so that the error rate is reduced.

Figure 7F:
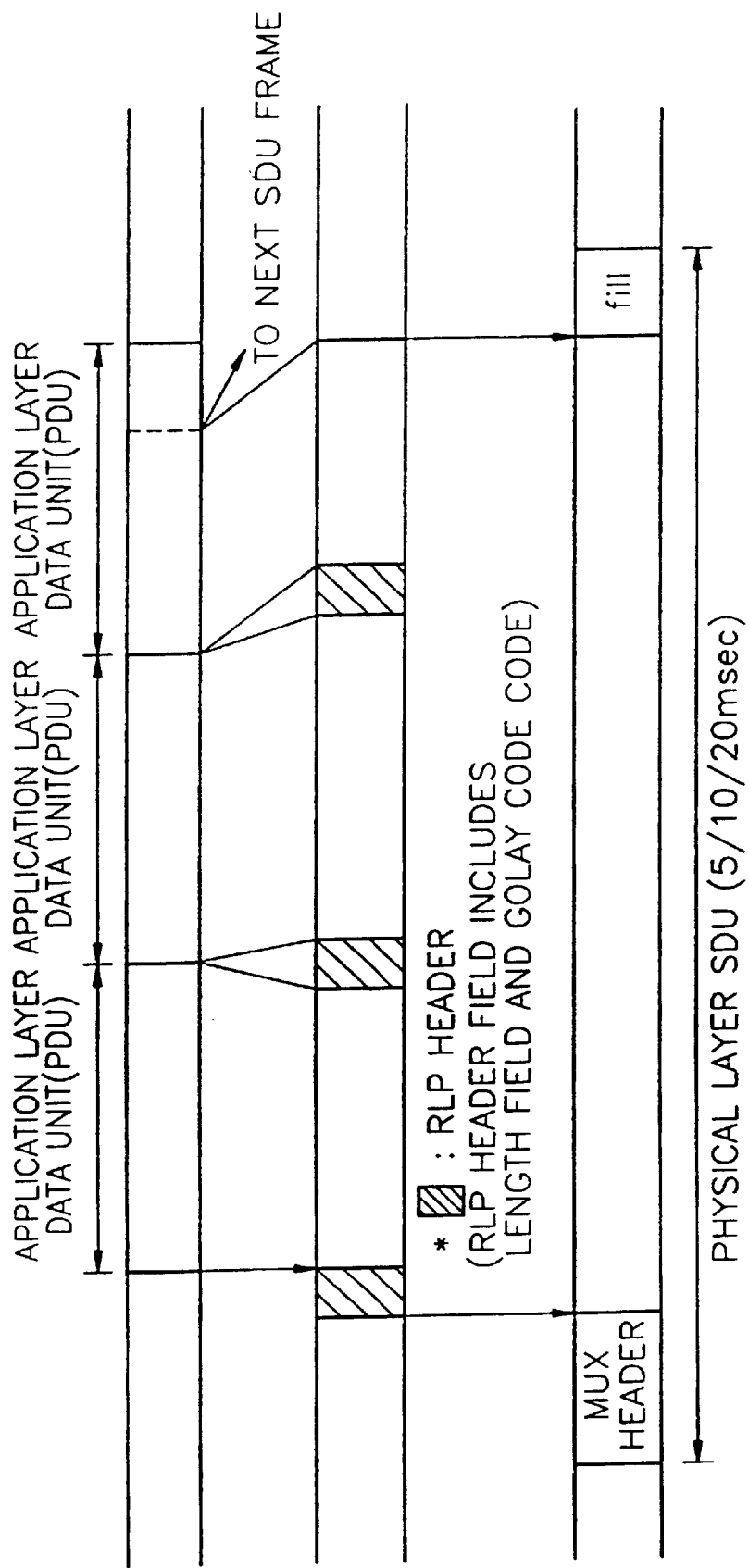
FIG. 7F illustrates the formation of a physical layer SDU using an encoding method according to a sixth embodiment of the present invention.

FIG. 7F illustrates the formation of a physical layer SDU using an encoding method according to a sixth embodiment of the present invention. The encoding method according to the sixth embodiment is applied to the case where at least two application layer data units (PDUs) are aligned within a physical layer SDU with RLP framing. Here, an application layer data unit (PDU) does not necessarily include all the data between the synchronization point of an application layer data unit (PDU) and the synchronization point of the next application layer data unit (PDU). In the sixth embodiment, video data corresponding to two application layer data units (PDUs) and part of an application layer data unit (PDU) are converted into RLP frames by RLP framing. During RLP framing, an RLP header is added to the header of each application layer data unit (PDU), a length field representing the length of an application layer data unit (PDU) is generated, and a Golay code is generated by Golay coding the length field. The RLP frames include RLP header fields into each of which the length field and the Golay code field are inserted. A MUX header, two complete RLP frames and part of a third RLP frame, and a fill bit region constitute a physical layer SDU.

Upon decoding the encoded frame according to the sixth embodiment, the reliability of the length of an information field is increased since the length field is protected from errors by the Golay code. That is, the length of the application layer data unit (PDU) is protected, so that the error rate is reduced.

Figure 8:
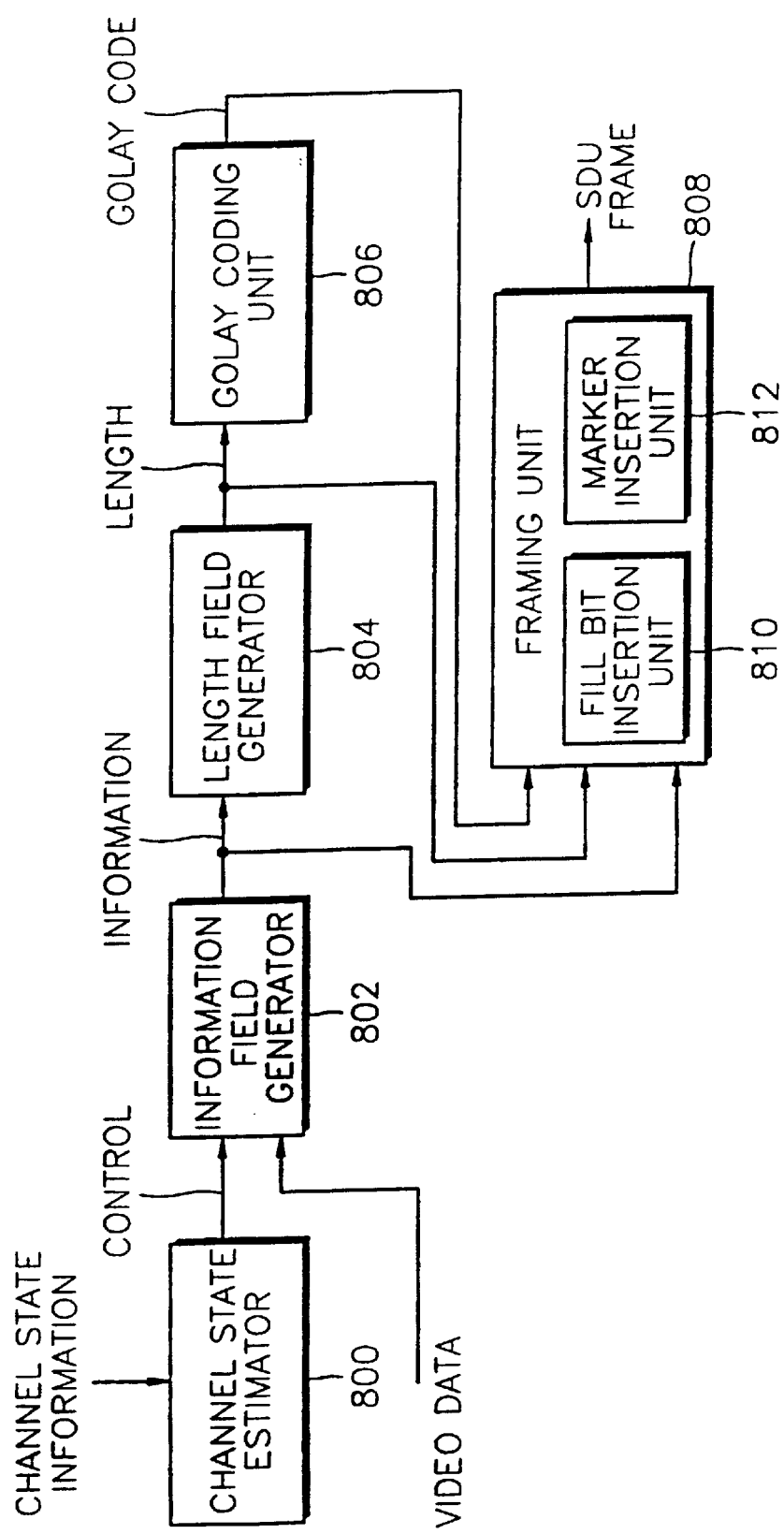
FIG. 8 is a block diagram of an encoding device according to the present invention.

FIG. 8 is a block diagram of an encoding device according to an embodiment of the present invention. The encoding device includes a channel state estimator 800, an information field generator 802, a length field generator 804, a Golay coding unit 806, and a framing unit 808. The channel state estimator 800 estimates the state of a channel using received channel state information and outputs a high level control signal CONTROL if the value of the channel state is equal to or less than a predetermined reference value, and a low level control signal CONTROL if the value of the channel state is greater than the predetermined reference value. The channel state information is obtained from a back channel.

The information field generator 802 generates an information field INFORMATION, which is video data comprised of an application layer data unit (PDU), in response to a high level control signal CONTROL, and a plurality of information fields, which are a plurality of application layer data units (PDU) that can be inserted within a predetermined window, in response to a low level control signal CONTROL. The length field generator 804 generates a length field representing the number of bits in an information field. It is preferable that the encoding device further includes a null indication field generator (not shown) for generating a null indication field.

The Golay coding unit 806 performs Golay coding, which is a type of error correction coding, with respect to the length field and the null indication field, to generate a Golay code.

The framing unit 808 performs RLP framing and simultaneously inserts the information field, the length field, and the Golay code into an SDU frame.

In this embodiment, the framing unit 808 includes a fill bit insertion unit 810 and a marker insertion unit 812. The fill bit insertion unit 810 inserts a series of fill bits having a constant binary value to achieve byte alignment, while performing the RLP framing for a fixed-length RLP frame. The marker insertion unit 812 inserts a marker which has uniqueness and a predetermined length. Alternatively, the framing unit 808 can perform the RLP framing for a variable length RLP frame, and thus does not need to insert fill bits during the RLP framing. In this way, the framing unit 808 outputs a physical layer SDU frame. The length field within the physical layer SDU frame is protected from errors by the Golay code.

The important aspects of the above-described embodiments will now be described.

According to an aspect of the present invention, a length field representing the length of a payload is inserted when data packetizing is performed in the layer between an application layer and a physical layer. The layer between the application layer and the physical layer may be a radio link protocol (RLP) layer or radio link control (RLC) protocol layer, which packetizes data descending from the application layer and/or depacketizes data ascending thereto. Alternatively, the layer between an application layer and a physical layer may be a MUX_sublayer or medium access control (MAC) layer, which packetizes data descending to the physical layer and/or depacketizes data ascending therefrom.

According to another aspect of the present invention, a variable-length data unit is generated when data packetizing is performed in the layer between an application layer and a physical layer. Also, preferably, a length field representing the length of a payload including the data unit is inserted. The layer between the application layer and the physical layer may be a radio link protocol (RLP) layer or radio link control (RLC) protocol layer, which packetizes data descending from the application layer and/or depacketizes data ascending thereto. Furthermore, it is preferable that fill bits and the length field representing the length of a payload including the data unit are inserted.

According to still another aspect of the present invention, a data unit generated in the application layer is aligned within a data unit generated in a physical layer located below the application layer, when data packetizing is performed in the layer between the application layer and the physical layer.

According to yet another aspect of the present invention, when a layer, which packetizes data descending to the physical layer and/or depacketizes data ascending therefrom, is set to be a first layer, and a layer, which packetizes data descending from the application layer and/or depacketizes data ascending thereto, is set to be a second layer, a data unit generated in the second layer is aligned within a data unit generated in the first layer while data packetizing is performed in the layer between the application layer and the physical layer. Here, preferably, the first layer is a MUX_sublayer or an MAC layer, and the second layer is an RLP layer or an RLC protocol layer.

According to the encoding methods of the embodiments of the present invention, data is aligned to generate a variable length data unit while being packetized in a layer between an application layer and a physical layer, and a length field representing the length of a payload is inserted. Therefore, errors and overhead can be reduced.

Frame data encoded by the above encoding methods is decoded by a decoding method according to the present invention. That is, in order to transceive multimedia, data is encoded by a multimedia data encoding method including inserting a length field representing the length of a payload while data is packetized in the layer between an application layer and a physical layer, and the encoded data is decoded with reference to the length field when the length field is added to the encoded data.

Also, in order to transceive multimedia data, a variable length data unit is encoded by a multimedia data encoding method including the step of generating a variable length data unit while data is packetized in the layer between an application layer and a physical layer, and the encoded variable length data unit can be decoded by a known decoding method. When the variable length data unit is encoded by a multimedia data encoding method which further includes inserting a length field representing the length of a payload including the data unit, after the generating step, it can be decoded with reference to the length field.

Also, in order to transceive multimedia data, a data unit of a layer below the application layer is encoded by a multimedia data encoding method including the step of aligning a data unit generated in the application layer within a data unit of the layer below the application layer while data is packetized in the layer between the application layer and the physical layer, and the encoded data unit can be decoded by a known decoding method. When the aligning step is a step of aligning a data unit generated in the application layer, and a data unit to which a length field representing the length of a payload including the data unit is added, within a data unit of the layer below the application layer while data is packetized in the layer between the application layer and a physical layer, the encoded data unit of the layer below the application layer can be decoded with reference to the length field.

Also, in order to transceive multimedia data, when a layer, which packetizes data descending to the physical layer and/or depacketizes data ascending therefrom, is set to be a first layer, and a layer, which packetizes data descending from the application layer and/or depacketizes data ascending thereto, is set to be a second layer, a data unit generated in the first layer is encoded by a multimedia data encoding method including the step of aligning a data unit generated in the second layer within a data unit generated in the first layer while data packetizing is performed in the layer between the application layer and the physical layer. Then, the encoded data unit can be decoded by a known decoding method. When the aligning step is a step of aligning a data unit generated in the second layer, and a data unit into which a length field representing the length of a payload including the data unit is added, within a data unit of the first layer while data is packetized in the layer between the application layer and the physical layer, the encoded data unit of the first layer can be decoded with reference to the length field. Also, when the aligning step is a step of aligning a data unit generated in the second layer, and a data unit into which fill bits and a length field representing the length of a payload including the data unit are added, within a data unit of the first layer while data is packetized in the layer between the application layer and the physical layer, the encoded data unit of the first layer can be decoded with reference to the length field.

Also, in order to transceive multimedia data, when a layer, which packetizes data descending to the physical layer and/or depacketizes data ascending therefrom, is set to be a first layer, and a layer, which packetizes data descending from the application layer and/or depacketizes data ascending thereto, is set to be a second layer, a data unit of the physical layer is encoded by a multimedia data encoding method including the step of aligning a data unit generated in the first layer within the data unit of the physical layer while data packetizing is performed in the layer between the application layer and the physical layer. Then, the encoded physical layer data unit can be decoded by a known decoding method. When the aligning step is a step of aligning a data unit generated in the first layer, and a data unit to which a length field representing the length of a payload including the data unit is added, within a physical layer data unit while data is packetized in the layer between the application layer and the physical layer, the encoded physical layer data unit can be decoded with reference to the length field.

Also, in order to transceive multimedia data, when a layer, which packetizes data descending to the physical layer and/or depacketizes data ascending therefrom, is set to be a first layer, and a layer, which packetizes data descending from the application layer and/or depacketizes data ascending thereto, is set to be a second layer, a physical layer data unit is encoded by a multimedia data encoding method. This method includes the steps of aligning a data unit generated in the second layer within a data unit generated in the first layer, and aligning a data unit generated in the first layer within a physical layer data unit, while data packetizing is performed in the layer between the application layer and the physical layer. Then, the encoded physical layer data unit can be decoded by a known decoding method.

Figure 9:
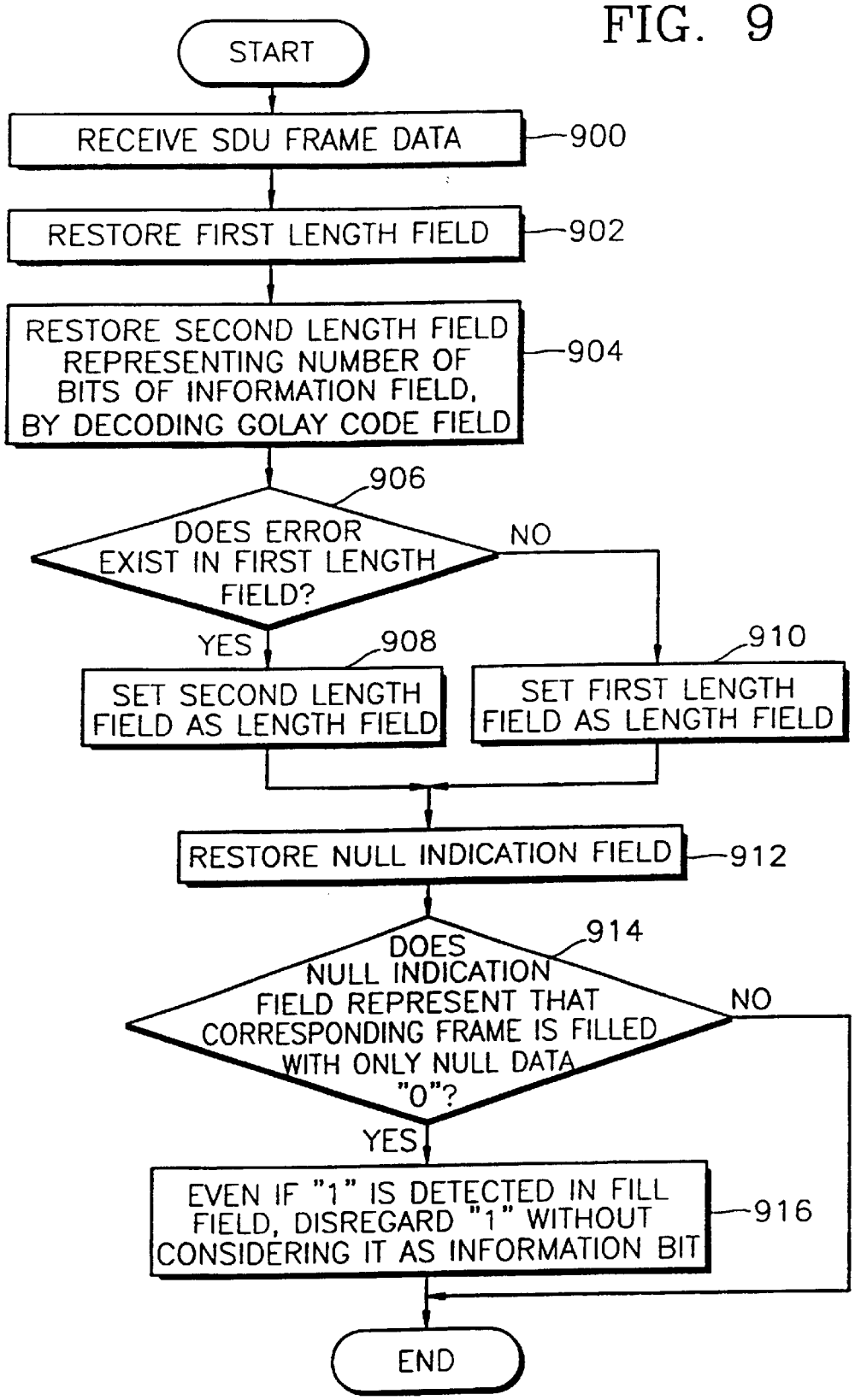
FIG. 9 is a flowchart illustrating a decoding method according to the present invention.

FIG. 9 is a flowchart illustrating a decoding method according to the most preferable embodiment of the present invention. First, SDU frame data, which has been encoded by the above encoding methods or an encoding device for performing the encoding methods, is received (step 900). Next, a first length field is restored from the SDU frame data (step 902). Then, a second length field representing the number of bits of an information field is restored by decoding a Golay code (step 904).

Following this, it is determined whether the first length field has errors (step 906). If it is determined that the first length field has errors, the second length field is set as the length field (step 908). Otherwise, the first length field is set as a length field (step 910). Thereafter, decoding is performed with reference to the set length field (not shown).

In the first embodiment, the information field can be filled with null data. Hence, in the decoding process, a null indication field representing whether the information field is filled with null bits is restored (step 912). Then, it is determined whether the null indication field represents that a corresponding frame is filled with only null bits ("0"s) (step 914). If the null indication field represents that a corresponding frame is filled with only null bits ("0"s), even if "1" is detected in the fill bit region, "1" is not regarded as an information bit (step 916).

Also, it is preferable that the decoding method further includes the step (not shown) of detecting a marker having uniqueness and inserted between the information field and the fill bit region, when an encoding method is a method for forming a physical layer SDU without using RLP framing.

According to the decoding method of the present invention described above, information on the length of an information field can be restored even if a length field is damaged, since the length field has been protected from errors by a Golay code. That is, the capability of restoring information on the length of an application layer data unit is increased, which reduces the error rate.

Figure 10:
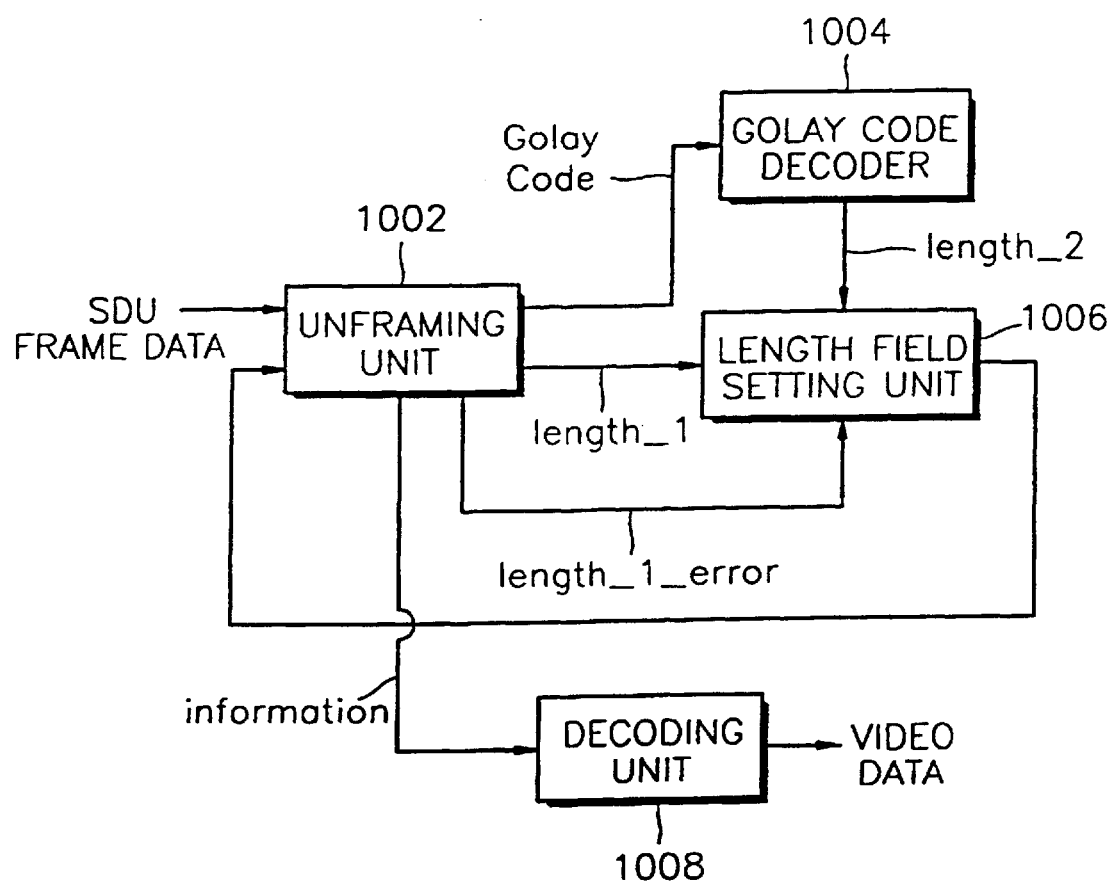
FIG. 10 is a block diagram of a decoding device according to the present invention.

FIG. 10 is a block diagram of a decoding device according to an embodiment of the present invention. The decoding device includes an unframing unit 1002, a Golay code decoder 1004, a length field setting unit 1006, and a decoding unit 1008.

The unframing unit 1002 restores a first length field (length_1), which represents the length of an information field, and a Golay code from received SDU frame data. If an error occurs when the first length field (length_1) is restored, the unframing unit 1002 outputs a high level error signal (length_1_error) which indicates that an error occurred when the first length field (length_1) was restored. The Golay code decoder 1004 decodes a Golay code to restore a second length field (length_2) which represents the number of bits of an information field. The length field setting unit 1006 sets the second length field (length_2) as a length field in response to the high level error signal (length_1_error) and outputs the set length field to the unframing unit 1002. On the other hand, if the error signal (length_1_error) is not high, the length field setting unit 1006 sets the first length field (length_1) as a length field and outputs the set length field to the unframing unit 1002. The unframing unit 1002 extracts information bits with reference to the length field representing the length of an information field. The decoding unit 1008 decodes the restored information bits to output video data.

The encoding and decoding methods according to the present invention described above can be written as computer programs. These programs can be stored in a computer readable recording medium. The recording medium includes magnetic recording media such as floppy disks or hard discs, and optical recording media such as CD-ROMs or DVDs. Also, these programs can be transmitted via a carrier wave such as the Internet. Each of the programs includes a code and code segments which can be easily inferred by the programmers of the technical field to which the present invention pertains. The encoding and decoding methods according to the present invention can be realized with general-use digital computers by reading the programs from computer readable recording media and operating the read programs.

As described above, the encoding methods according to the present invention reduce overhead when multimedia data including video data is transmitted and received in the radio environment, and decrease the error rate, thereby improving the quality of an image.

What is claimed is:

1. A method of encoding multimedia data including video data, comprising the steps of:
   (a) generating a length field representing a number of bits in an information field;
   (b) generating a null indication field indicating an existence of only null data, if only null data exists in the information field;
   (c) generating an error correction code by performing error correction coding solely with respect to the length field and the null indication field; and
   (d) inserting into a frame the length field and the error correction code during radio link protocol (RLP) framing.

2. The encoding method of claim 1, wherein the step (d) further comprises the steps of performing RLP framing for a fixed-length RLP frame and inserting into the frame a series of fill bits having a constant binary value during the RLP framing to achieve byte alignment to complete the fixed length.

3. The encoding method of claim 1, wherein in the step (d), RLP framing for a variable-length RLP frame is performed, and the insertion of fill bits into the frame is not performed.

4. The encoding method of any of claims 2 or 3, wherein the error correction coding in the step (c) is Golay coding, and the error correction code is a Golay code which is generated by the Golay coding.

5. A method of encoding multimedia data including video data, comprising the steps of:
   (a) generating an information field that is video data comprised of an application layer data unit;
   (b) generating a length field representing the number of bits in the information field;
   (c) generating an error correction code by performing error correction coding solely with respect to the length field; and
   (d) inserting into a frame the fields and the error correction code in the course of forming a physical layer service data unit (SDU).

6. The encoding method of claim 5, further comprising the step of (e) inserting fill bits to form a fill bit region and complete a window having a predetermined length.

7. A method of encoding multimedia data including video data, comprising the steps of:
   (a) generating an information field that is video data comprised of an application layer data unit;
   (b) generating a length field representing the number of bits in the information field;
   (c) generating an error correction code by performing error correction coding with respect to the length field;
   (d) inserting into a frame the fields and the error correction code in the course of forming a physical layer service data unit (SDU); and
   (e) inserting fill bits to form a fill bit region and complete a window having a predetermined length;
   wherein in the step (e), the predetermined length of the window is 20 msec, and the fill bits have a predetermined binary value and are inserted to complete the 20 msec length of the window.

8. A method of encoding multimedia data including video data, comprising the steps of:
   (a) generating an information field that is video data comprised of an application layer data unit;
   (b) generating a length field representing the number of bits in the information field;
   (c) generating an error correction code by performing error correction coding with respect to the length field;
   (d) inserting into a frame the fields and the error correction code in the course of forming a physical layer service data unit (SDU); and
   (e) inserting a marker which has uniqueness and a predetermined length, between the information field and the fill bit region.

9. A method of encoding multimedia data including video data, comprising the steps of:
   (a) generating an information field that is video data comprised of an application layer data unit;
   (b) generating a length field representing the number of bits in the information field;
   (c) generating an error correction code by performing error correction coding with respect to the length field; and
   (d) inserting into a frame the fields and the error correction code in the course of forming a physical layer service data unit (SDU),
   wherein the length field is inserted to the rear of a MUX header.

10. An encoding method for wireless transceiving of multimedia data including video data, comprising the steps of:
    (a) generating a plurality of information fields depending on the number of application layer data units that can fit into a predetermined window;
    (b) generating a length field representing the sum of the number of bits in each of the plurality of information fields;
    (c) generating an error correction code by performing error correction coding solely with respect to the length field; and
    (d) inserting into a frame the fields and the error correction code in the course of aligning an application layer data unit and an RLP unit within a physical layer service data unit (SDU).

11. An encoding method for wireless transceiving of multimedia data including video data, comprising the steps of:
    (a) generating a plurality of information fields depending on the number of application layer data units that can fit into a predetermined window;
    (b) generating a length field representing the sum of the number of bits in each of the plurality of information fields;
    (c) generating an error correction code by performing error correction coding with respect to the length field; and
    (d) inserting into a frame the fields and the error correction code in the course of aligning an application layer data unit and an RLP unit within a physical layer service data unit (SDU);
    wherein the application layer data unit is an H.223 MUX_PDU in the case of an H.324M standard, or a packet data unit, which satisfies an H.225 standard, in the case of an H.323 standard.

12. A method of encoding multimedia data including video data, comprising the steps of:
    (a) estimating the state value of a channel; if it is determined in step (a) that the state value of the channel is equal to or less than a predetermined reference value,
    (a-1) generating an information field which is video data comprised of an application layer data unit;
    (b-1) generating a length field representing the number of bits in the information field; (c-1) generating an error correction code by performing error correction coding with respect to the length field; and
    (d-1) inserting into a frame the fields and the error correction code in the course of aligning an application layer data unit and an RLP unit within a physical layer service data unit (SDU), if it is determined in step (a) that the state value of the channel is greater than the predetermined reference value;
    (a-2) generating a plurality of information fields which are a plurality of application layer data units which fit into a predetermined window;
    (b-2) generating a length field representing the sum of the number of bits in each of the plurality of information fields;
    (c-2) generating an error correction code by performing error correction coding with respect to the length field; and (d-2) inserting into the frame the fields and the error correction code in the course of aligning an application layer data unit and an RLP unit within a physical layer service data unit (SDU).

13. The encoding method of claim 12, wherein the application layer data unit is an H.223 MUX_PDU in the case of an H.324M standard or a packet data unit, which satisfies an H.225 standard, in the case of an H.323 standard.

14. An encoding device for wireless transceiving of multimedia data, comprising:
a length field generator for generating a length field representing the number of bits in an RLP payload;
a null indication field generator for generating a null indication field;
an error correction coding unit for generating an error correction code by performing error correction coding solely with respect to the length field and the null indication field; and
an RLP framing unit for performing RLP framing and inserting into a frame the length field, the null indication field, and the error correction code in the course of RLP framing.

15. The encoding device of claim 14, wherein the RLP framing unit further comprises a fill bit insertion unit for performing RLP framing for a fixed-length RLP frame and inserting a series of fill bits having a constant binary value during the RLP framing to achieve byte alignment to complete the fixed length.

16. An encoding device for wireless transceiving of multimedia data, comprising:
a length field generator for generating a length field representing the number of bits in an RLP payload;
a null indication field generator for generating a null indication field;
an error correction coding unit for generating an error correction code by performing error correction coding with respect to the length field and the null indication field; and
an RLP framing unit for performing RLP framing and inserting into a frame the length field, the null indication field, and the error correction code in the course of RLP framing,
wherein in the RLP framing unit, RLP framing for a variable-length RLP frame is performed, and the insertion of fill bits is not performed.

17. The encoding device of claim 16, wherein the error correction coding unit performs Golay coding, and the error correction code is a Golay code which is generated by the Golay coding.

18. An encoding device for wireless transceiving of multimedia data, comprising: an information field generator for generating an information field having an amount of video data that fits into a window having a predetermined length;
a length field generator for generating a length field representing the number of bits of an RLP payload;
an error correction coding unit for generating an error correction code by performing error correction coding solely with respect to the length field; and
a framing unit for inserting into a frame the fields and the error correction code in the course of forming a physical layer service data unit (SDU).

19. The encoding device of claim 18, further comprising a fill bit insertion unit for inserting into the frame fill bits to achieve byte alignment to complete a window having a predetermined length.

20. The encoding device of claim 18, further comprising a marker insertion unit for inserting a marker which has uniqueness and a predetermined length, between the information field and the fill bit field.

21. An encoding device for wireless transceiving of multimedia data including video data, comprising:
a channel state estimator for estimating the state value of a channel, and outputting a control signal having a first logic value if the state value of the channel is equal to or less than a predetermined reference value, and outputting a control signal having a second logic value if the state value of the channel is greater than the predetermined reference value;
an information field generator for generating an information field that is video data comprised of an application layer data unit, in response to the control signal having the first logic value, and generating a plurality of information fields, which are a plurality of application layer data units that can fit into a predetermined window, in response to the control signal having the second logic value;
a length field generator for generating a length field representing the number of bits of an RLP payload;
an error correction coding unit for generating an error correction code by performing error correction coding solely with respect to the length field; and
a framing unit for inserting into a fixed-length RLP frame the fields and the error correction code in the course of forming a physical layer service data unit (SDU).

22. The encoding device of claim 21, wherein in the framing unit, RLP framing for a variable-length RLP frame is performed, and the insertion of fill bits is not performed.

23. An encoding device for wireless transceiving of multimedia data including video data, comprising:
a channel state estimator for estimating the state value of a channel, and outputting a control signal having a first logic value if the state value of the channel is equal to or less than a predetermined reference value, and outputting a control signal having a second logic value if the state value of the channel is greater than the predetermined reference value;
an information field generator for generating an information field that is video data comprised of an application layer data unit, in response to the control signal having the first logic value, and generating a plurality of information fields, which are a plurality of application layer data units that can fit into a predetermined window, in response to the control signal having the second logic value;
a length field generator for generating a length field representing the number of bits of an RLP payload;
an error correction coding unit for generating an error correction code by performing error correction coding with respect to the length field; and
a framing unit for inserting into a fixed-length RLP frame the fields and the error correction code in the course of forming a physical layer service data unit (SDU);
wherein the application layer data unit is an H.223 MUX_PDU in the case of an H.324M standard or a packet data unit, which satisfies an H.225 standard, in the case of an H.323 standard.

24. An encoding device for wireless transceiving of multimedia data including video data, comprising:
a channel state estimator for estimating the state value of a channel, and outputting a control signal having a first logic value if the state value of the channel is equal to or less than a predetermined reference value, and outputting a control signal having a second logic value if the state value of the channel is greater than the predetermined reference value;

an information field generator for generating an information field that is video data comprised of an application layer data unit, in response to the control signal having the first logic value, and generating a plurality of information fields, which are a plurality of application layer data units that can fit into a predetermined window, in response to the control signal having the second logic value;

a length field generator for generating a length field representing the number of bits of an RLP payload;

an error correction coding unit for generating an error correction code by performing error correction coding with respect to the length field; and a framing unit for inserting into a fixed-length RLP frame the fields and the error correction code in the course of forming a physical layer service data unit (SDU), wherein the framing unit performs RLP framing for the fixed-length RLP frame and inserts the length field, the null indication field, and the error correction code during the RLP framing for a fixed-length RLP framing, and further comprises a fill bit insertion unit for inserting into the fixed-length RLP frame a series of fill bits having a constant logic value during the RLP framing to achieve byte alignment to complete the fixed length.

25. A method of receiving and decoding frame data encoded by an encoding method including generating a first length field representing the number of bits in an information field, generating an error correction code by performing error correction coding with respect to the first length field, and inserting into a frame the first length field and the error correction code in the course of framing, the method comprising the steps of:

(a) restoring from the frame data the first length field representing the length of the information field;

(b) restoring a second length field representing the number of bits in the information region by decoding the error correction code;

(c) setting the second length field as a set length field if there is an error in the first length field, and otherwise, setting the first length field as the set length field; and (d) performing decoding with reference to the set length field.

26. The decoding method of claim 25, further comprising the steps of:

(e) restoring a null indication field representing that the information field includes null bits; and (f) determining whether the null indication field represents that the frame is filled with only null bits;

wherein if it is determined in step (f) that the null indication field represents that the frame is filled with only null bits, even if "1" is generated in a fill bit region, "1" is not regarded as an information bit.

27. The decoding method of claim 25, wherein the framing process is a radio link protocol (RLP) framing process.

28. The decoding method of claim 25, wherein the framing process is a method of forming a physical layer service data unit (SDU) without using RLP framing, and further comprising a step (g) of inserting a marker which has uniqueness, between the information field and the fill bit region.

29. A device for receiving and decoding frame data encoded by an encoding device including a length field generator for generating a first length field representing the number of bits in an information field, an error correction coding unit for generating an error correction code by performing error correction coding with respect to the first length field, and a framing unit for performing framing and inserting into a frame the first length field and the error correction code in the course of framing, the device comprising:

an unframing unit for restoring the first length field representing the length of the information field from received service data unit (SDU) frame data, and outputting an error signal having a first logic level indicating the existence of an error upon restoring the first length field, if an error is generated;

an error correction code decoder for restoring a second length field representing the number of bits in the information field by decoding the error correction code;

a length field setting unit for setting the second length field as a set length field in response to the error signal having the first logic level and outputting the second length field to the unframing unit, and setting the first length field as the set length field in response to an error signal having a second logic level and outputting the first length field to the unframing unit; and a decoding unit for decoding the restored information field to output video data.

30. The decoding device of claim 29, wherein the error correction coding is Golay coding, and the error correction code is a Golay code.

31. An encoding device for wireless transceiving of multimedia data, comprising:

a length field generator for generating a length field representing the number of bits in an RLP payload;

a null indication field generator for generating a null indication field;

an error correction coding unit for generating an error correction code by performing error correction coding with respect to the length field and the null indication field; and an RLP framing unit for performing RLP framing and inserting into a frame the length field, the null indication field, and the error correction code in the course of RLP framing, wherein the error correction coding unit performs Golay coding, and the error correction code is a Golay code which is generated by the Golay coding.

32. An encoding device for wireless transceiving of multimedia data, comprising:

a length field generator for generating a length field representing the number of bits in an RLP payload;

a null indication field generator for generating a null indication field;

an error correction coding unit for generating an error correction code by performing error correction coding with respect to the length field and the null indication field; and an RLP framing unit for performing RLP framing and inserting into a frame the length field, the null indication field, and the error correction code in the course of RLP framing;

wherein the RLP framing unit further comprises a fill bit insertion unit for performing RLP framing for a fixed-length RLP frame and inserting a series of fill bits having a constant binary value during the RLP framing to achieve byte alignment to complete the fixed length, and wherein the error correction coding unit performs Golay coding, and the error correction code is a Golay code which is generated by the Golay coding.

33. An encoding device for wireless transceiving of multimedia data, comprising: an information field generator for generating an information field having an amount of video data that fits into a window having a predetermined length;

a length field generator for generating a length field representing the number of bits of an RLP payload;

an error correction coding unit for generating an error correction code by performing error correction coding with respect to the length field;

a framing unit for inserting into a frame the fields and the error correction code in the course of forming a physical layer service data unit (SDU);

a fill bit insertion unit for inserting into the frame fill bits to achieve byte alignment to complete a window having a predetermined length; and a marker insertion unit for inserting a marker which has uniqueness and a predetermined length, between the information field and the fill bit field.

* * * * *